INVENTOR.
Lloyd B. Smith; John T. Guinn, Jr.
Allan Cox
BY

Attorneys

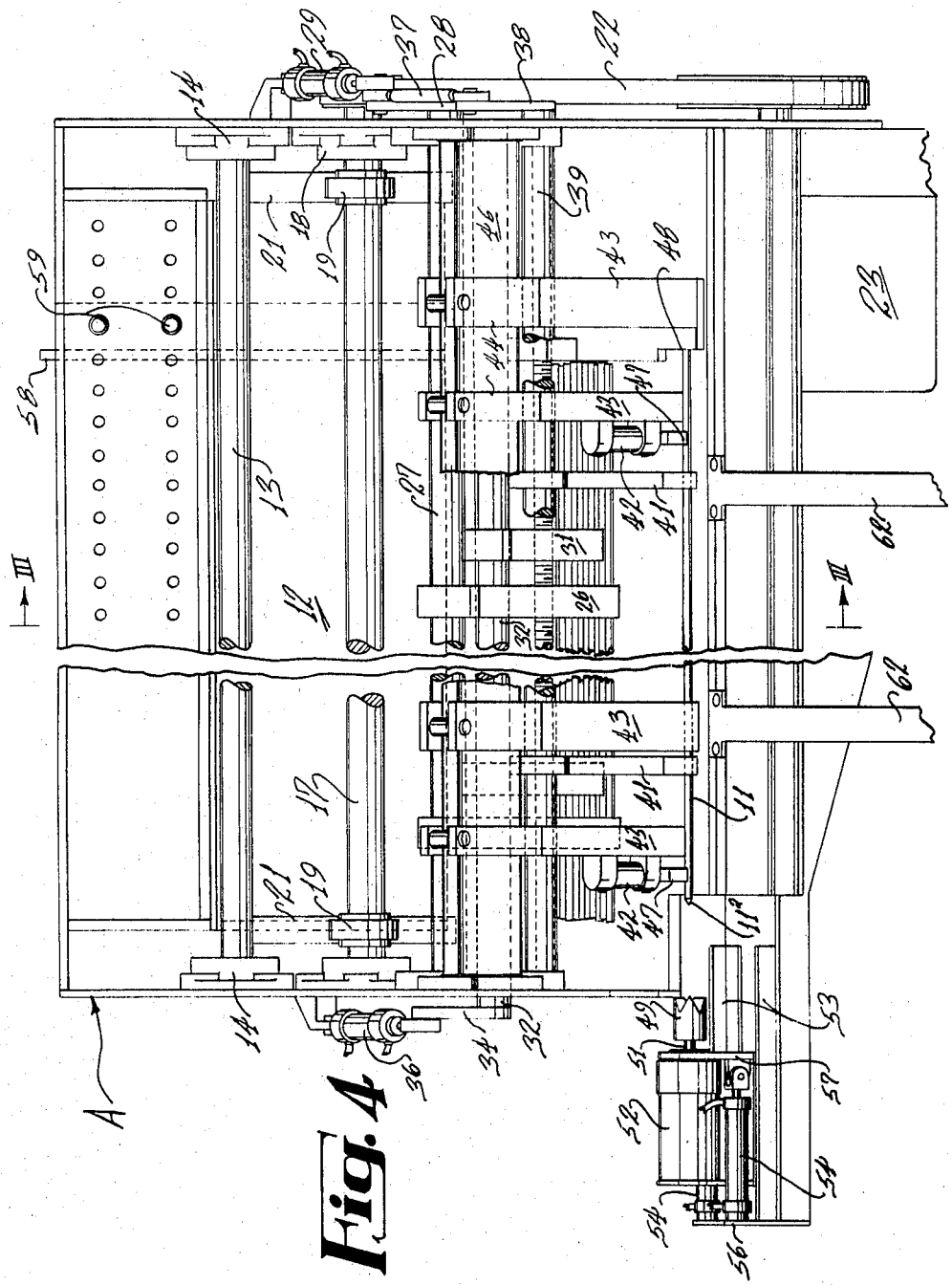

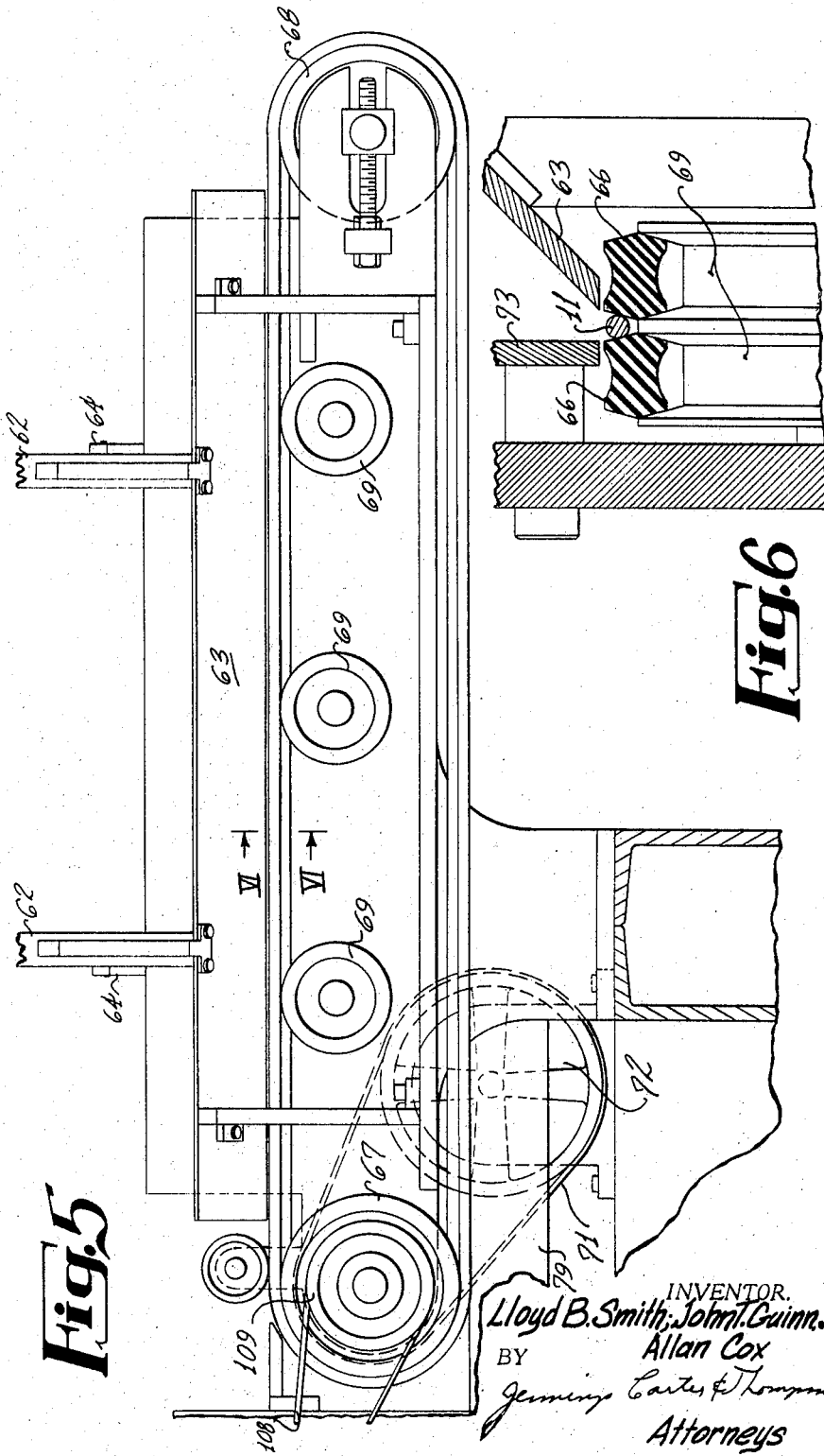

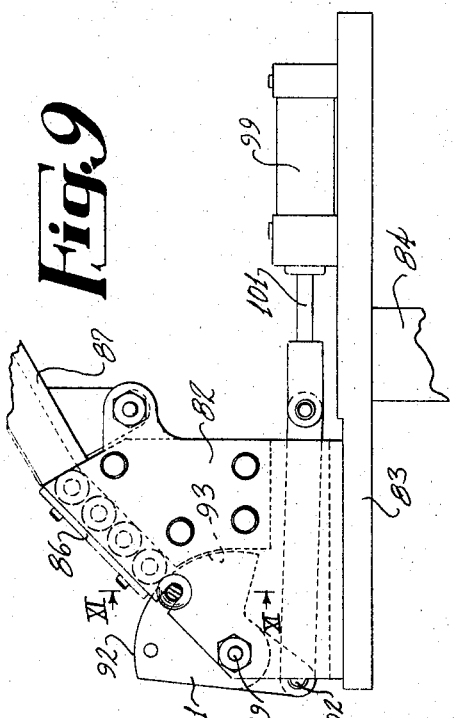

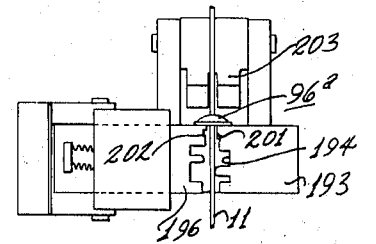
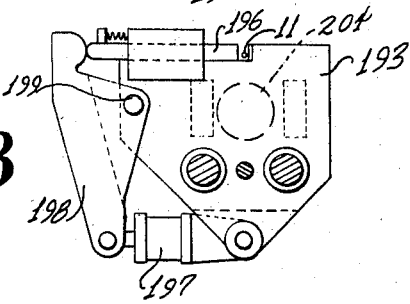
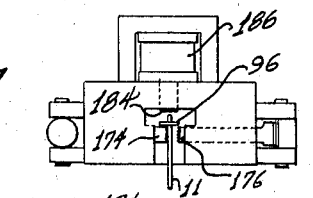
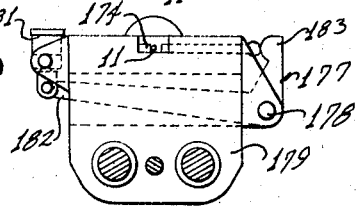
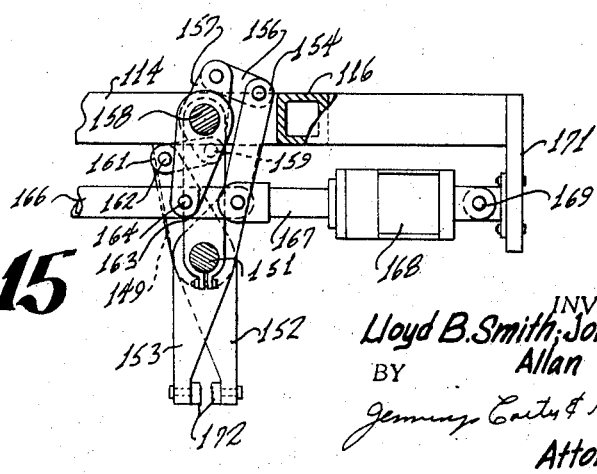

United States Patent Office 3,477,111
Patented Nov. 11, 1969

3,477,111
PROCESS AND APPARATUS FOR MANUFACTURING CONCRETE FORM TIES
Lloyd B. Smith and John T. Guinn, Jr., Birmingham, Ala., and Allan Cox, Clarksdale, Miss., assignors to The Dayton Sure-Grip and Shore Company, a corporation of Ohio
Filed July 12, 1967, Ser. No. 652,767
Int. Cl. B23p *17/00;* B23q *7/10*
U.S. Cl. 29—155                                   8 Claims

ABSTRACT OF THE DISCLOSURE

Process and apparatus for manufacturing concrete form ties in which pre-straightened blanks of wire are fed downwardly from a hopper, one by one, one end of the rod is chamfered, the wire is then threaded onto a multiplicity of washers and thereafter the ends of the wire are upset or headed, during the process of which the end washers on the wire are secured thereto, the intermediate or spreader washers are secured to the wire and the wire is crimped and coined, whereby a concrete form snap tie is provided.

---

This invention relates to the process and apparatus for manufacturing the so-called snap ties used for assembling concrete forms.

In this art it has heretofore been proposed to manufacture articles of this type by feeding from a roll a continuous length of wire, which is straightened, as it moves, and to thread such length of moving wire through at least two washers. See, for instance, Leger Patent 3,254,391. Further, it is old in this art to provide a concrete form tie embodying end washers, intermediate or spreader washers, and intermediate crimped and coined portions, the articles heretofore having been made primarily by a sequence of hand operations wherein workmen thread the washers by hand, crimp the ends by separate operations in separate crimping machines, and so forth, with regard to each operation, thus to produce the finished article. So far as we are aware no one has heretofore proposed a process and apparatus in which the entire sequence of operations is carried out automatically and in the sequence herein disclosed.

In view of the foregoing we propose a process and apparatus of the character designated in which a pre-straightened blank of wire, slightly longer than the length of the finished tie, is fed by gravity from a hopper downwardly into washer threading mechanisms. During an intermediate portion of its downward passage the wire is halted and one end is chamfered or sharpened for the purpose of providing ready entry through the series of washers. The wire is dropped downwardly onto a moving, friction-grip feed arrangement which moves the wire laterally of the machine, sharpened end first, through a plurality of washers separately supported in aligned holders. Once the washers are threaded onto the wire the unit is moved sequentially, from station to station in the apparatus where the ends are headed, thus to secure the outermost washers, thence to other stations where the intermediate washers are fastened securely to the wire and the wire between the two innermost washers is crimped and coined, thus to afford a firmer grip in the concrete to be poured around the wire and to weaken the wire for breaking after the concrete sets. After the last operation the completed unit is delivered from the apparatus for packaging.

Apparatus illustrating the constructional features of our invention and which also is suitable for carrying out our improved process is shown in the accompanying drawings forming a part of this application in which:

FIG. 4 is a front elevational view of the hopper feed mechanism, certain of the other parts being broken away for the sake of clarity;

FIG. 5 is an enlarged detail sectional view taken generally in the direction of the arrows V—V of FIG. 3, and having added thereto and in section certain portions of the supporting framework;

FIG. 6 is a fragmental detail sectional view, drawn to an enlarged scale and taken generally along line VI—VI of FIG. 5;

FIG. 7 is a detail sectional view taken generally along line VII—VII of FIG. 2.

FIG. 8 is a detail sectional view taken along line VIII—VIII of FIG. 7 and illustrating a portion of the feed means used to thread the wire through the washers;

FIG. 9 is a detail view to an enlarged scale taken along line IX—IX of FIG. 7 and showing one of the washer holding devices in wire receiving position;

FIG. 10 is a view corresponding in part to FIG. 9 showing one of the washer holding mechanisms in withdrawn position, permitting the washer threaded wire to be removed;

FIG. 11 is a detail sectional view taken generally along line XI—XI of FIG. 9 and illustrating the details of the lead or chamfered end of the wire in position relative to the washer holding mechanism, prior to being removed from the end of the washer holding devices;

FIG. 12 is a fragmental front elevation of one of the washer holding devices such as shown in FIGS. 9 and 10.

FIG. 14 is a detached isometric view of the movable portion of one of the washer holding mechanisms;

FIG. 15 is a fragmental detail sectional view illustrating a typical one of the pickup and transfer fingers and associated operating mechanism employed for moving the washer carrying wire from one work station to the other;

FIG. 16 is a detail, fragmental side elevational view of one of the mechanisms for heading the ends of the wire and affixing thereto the outermost washer;

FIG. 17 is a plan view of the mechanism shown in FIG. 16;

FIG. 18 is a detached, side elevational view, partly in section, showing a typical one of the mechanisms for crimping and coining the wire and for securing the intermediate washers thereto;

FIG. 19 is a plan view of the mechanism shown in FIG. 18;

FIG. 20 is a detail sectional view taken generally along the line XX—XX of FIG. 2, and illustrating a portion of the drive means for the transfer mechanism; and FIG. 21 is a diagram illustrating the path of one set of the pickup and transfer fingers.

Figure 1:
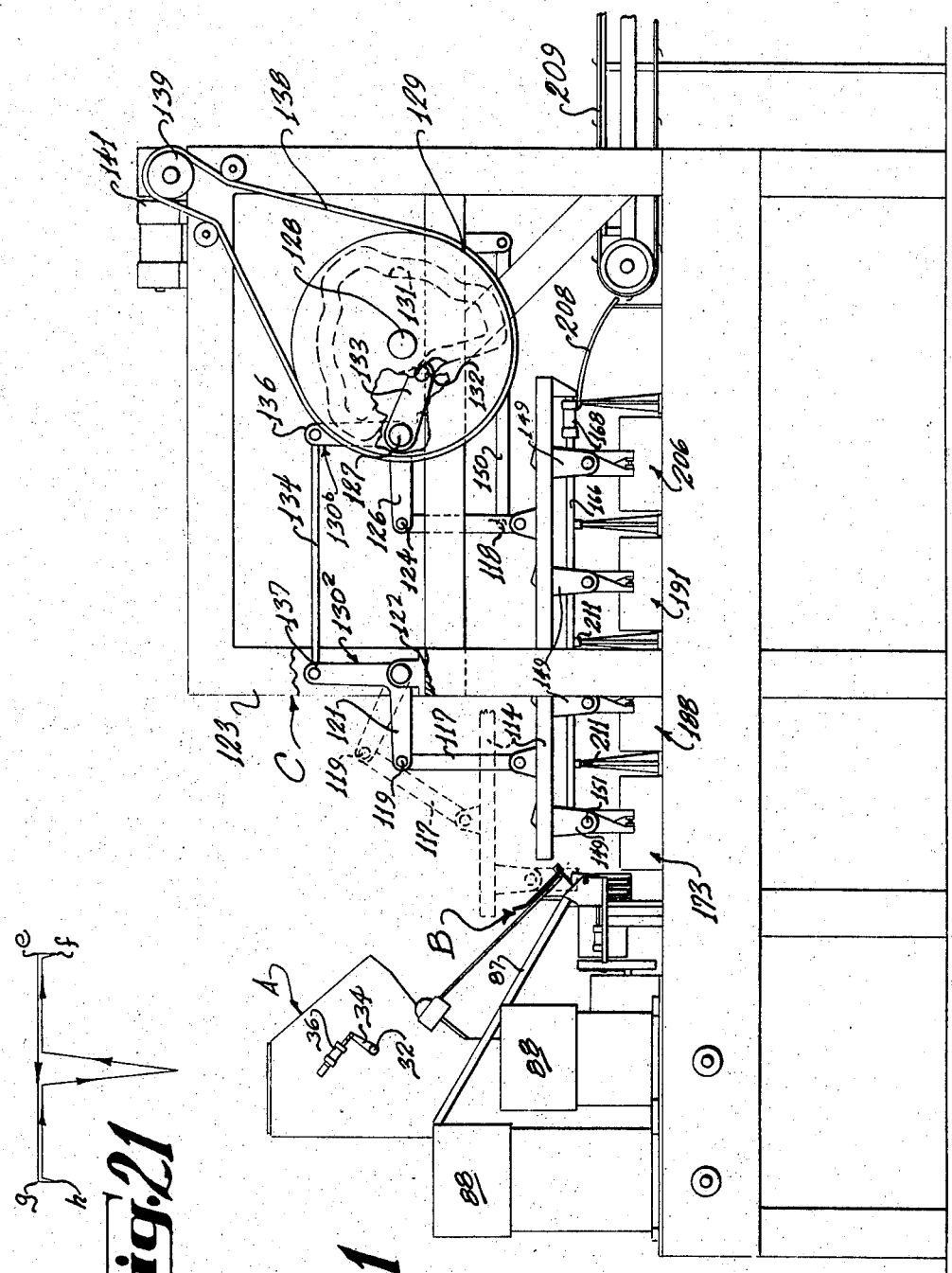
FIG. 1 is a diagrammatic, overall side view of our improved apparatus.

Referring now to the drawings for a better understanding of our invention it will be seen that for purposes of description our improved apparatus may be divided generally into three parts. That is to say, as shown particularly in FIGS. 1 and 2, the apparatus may comprise a feed mechanism indicated generally by the letter A, mechanism B for threading the wire through the aligned series of washers and mechanism C which comprises means to head the ends of the wire, fix the washers thereto, and crimp and coin the wire thus to produce the finished product.

The wire feeding mechanism

Figure 3:
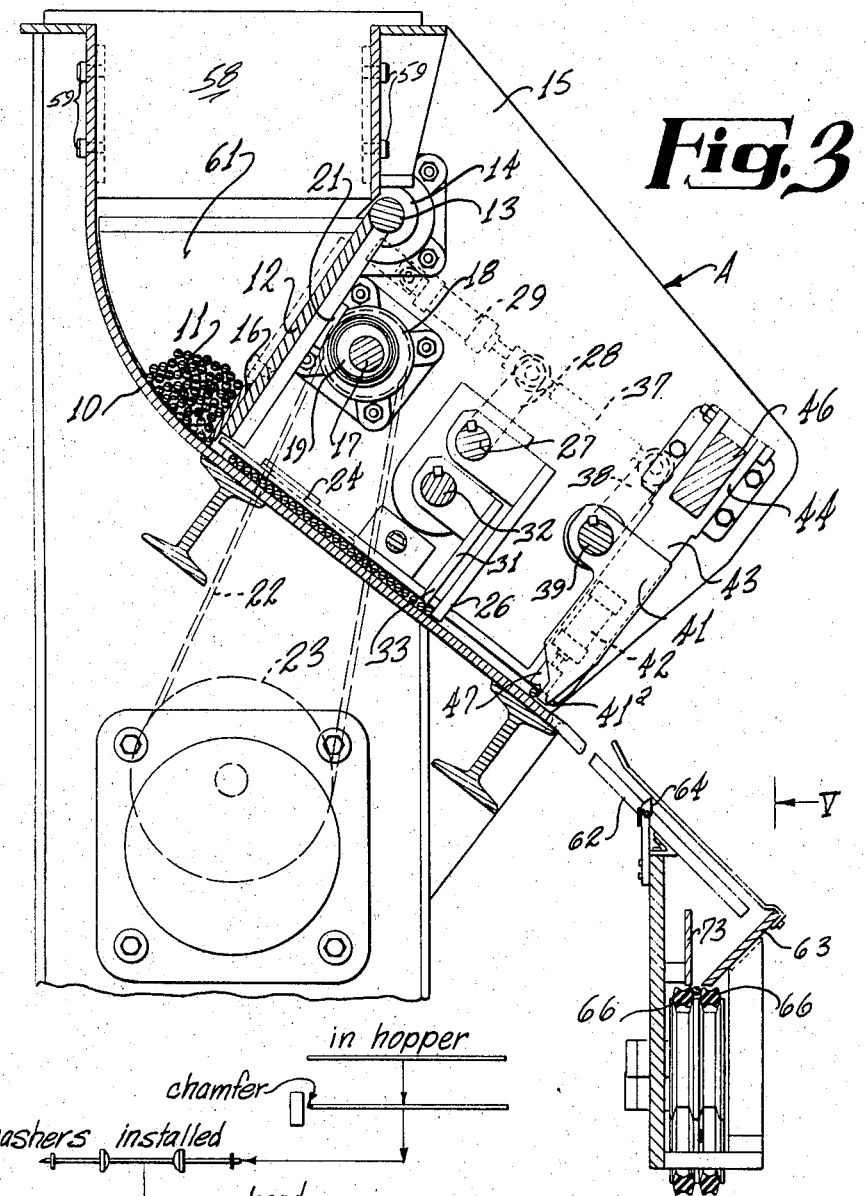
FIG. 3 is an enlarged detailed sectional view taken generally along line III—III of FIG. 4.

Referring particularly to FIGS. 3 and 4 the wire feeding device comprises a hopper having a curved bottom 10 into which a plurality of the pre-straightened wire blanks 11 are placed for feeding therefrom one at a time. The lower side of the hopper is formed by a plate-like member 12 which is mounted on a shaft 13 in turn journaled in suitable bearings 14 in the framework 15 of the hopper. The lower end of the plate member 12 is spaced above the inside of the wall 10 of the hopper bottom. Further, a wear plate 16 is secured to a side of the plate 12 at its lower end and is adjustable up and down on the plate thereby to provide clearance between the end of the wear plate 16 and the inner wall of the hopper, to pass blanks 11 of selected diameters.

At 17 we show a shaft journaled in bearings 18 and which spans the hopper. Mounted on the shaft 17 are eccentric cams 19 which engage wear plates 21 on the side of the plate 12. The shaft 17 is driven through a suitable belt 22 from a motor 23. Therefore, as the shaft 17 rotates plate 12 and hence the wear plate 16 oscillate about the shaft 13, in effect thereby forming an escapement mechanism for feeding the wires or blanks 11 consecutively from the pile thereof in the hopper.

From beneath the lower end of the wear plate 16 the wires pass one at a time in a row under end hold-down plates 24. The lowermost one of the wires of the row of the same held by the hold-down plates 24 is engaged and momentarily stopped by a plate 26 which forms a part of an escapement mechanism for letting the wires fall one at a time into mechanism presently to be described and which is located below the plate 26. Thus, the plate 26 is mounted, effectively, on a shaft 27 journaled in the framework of the hopper and which spans the hopper. Secured to the shaft 27 is an arm 28 which is intermittently rocked to the left as viewed in FIG. 3 by a small fluid pressure cylinder 29 the piston rod of which is connected to the upper end of the arm as illustrated in the drawings. Thus, energization of cylinder 29 causes shaft 27 to move counterclockwise, thereby lifting the lower end of the escapement plate 26 sufficiently to permit one rod to roll by gravity down the plate 10.

A second escapement plate or finger 31 is mounted on a second cross shaft 32. It will be noted that the lower end of the finger 31 is sharpened or pointed as illustrated at 33. The shaft 32 has an arm 34 secured thereto and the arm 34 is connected to the piston rod of a small fluid pressure cylinder 36. See FIGS. 1 and 4. Thus, energization of cylinder 36 raises the sharpened lower end 33 of the arm 31, in proper sequence relative to operation of the plate 26, to permit one by one discharge of the wires 11 from the row thereof.

Also connected to the upper end of arm 28, thereby to be actuated simultaneously with the rotation of shaft 27, is a link 37 pivotally connected at its lower end to an arm 38. The arm 38 is in turn secured to a cross shaft 39. Also secured to the shaft 39 is a positioning stop member 41, the lower end 41a of which is adapted momentarily to halt the downward movement of the wires 11. As shown in the drawings, there are two of the arms 41 as well as at least two of the escapement plates or fingers 26 and 31.

From what has been described it will be seen that the blanks are fed under the oscillating plate 12 and wear plate 16, to provide and form the row of the wires under the hold-down plates 24. From the lower end of such row the wires are discharged one at a time, and momentarily, due to the fingers 41a, are halted approximately at the point shown in FIG. 3. It is at the position determined by the lower end 41a of the arms 41 that the wire blank is temporarily clamped in position and one end thereof is chamfered.

The chamfering mechanism itself comprises essentially two parts. First, with the wire in position as illustrated in FIG. 3 we provide a pair of small fluid pressure cylinders 42 which are mounted on depending arms 43. The arms 43 may have bifurcated upper ends 44 which are adapted to be clamped, in laterally spaced position, to a cross member 46 spanning the hopper. Thus, the arms may be moved toward and from each other to accommodate wires of different lengths, as will subsequently be mentioned.

Carried on the lower ends of the piston rods of the cylinders are wire clamp members 47. These wire clamps or hold-down blocks are properly related, positionwise, to the lower end of 41a of the arms 41 so that when the cylinders are energized in the downward direction the wire is held centered and against shifting and rotating movement and also against sliding movement upwardly or downwardly of the plate. However, the grip of the blocks 47 may permit the wire to slide axially and for its end to contact a stop plate 48, while the chamfering operation is being carried on. See FIG. 4.

At 49 we show a rotary chamfering tool mounted on the shaft 51 of a motor 52. The motor 52 and hence the chamfering tool 49 are mounted on ways 53 for sliding movement from left to right as viewed in FIG. 4. A pair of small cylinders 54, mounted against the plate 56, is arranged with their piston rods connected to a plate 57 in turn connected to the motor. Thus, energization of the cylinders 56 in one direction moves the entire motor and chamfering tool assembly to the right whereby the chamfering tool engages the end of the wire blank 11 then being held by the cylinders 42. Therefore, with the motor 52 in operation and the whole device moved to the right as viewed in FIG. 4, the left end of the wire as seen in that figure is pointed or sharpened, it being noted that the righthand end of the wire as shown in that figure abuts the stop member 48, thereby to give an accurate overall length to the wire. The end of the wire thus is chamfered or sharpened as indicated at 11a for a purpose later to appear.

In order to accommodate the hopper to different lengths of wires to be formed into ties, we provide a shiftable or false wall 58 at one end of the hopper. The wall 58 may be held in axially selected position relative to the length of the hopper by means of screws 59. It will also be noted that the stop member 48 is adjustably slideable along the bar 46. See FIG. 4. Further, the hopper side of the oscillating plate 12 may be provided with an end wall 61 which may be adjusted the length of the plate 12, to accommodate wires of different lengths.

From what has been described it will be seen that the hopper may be filled with the pre-straightened lengths of wire to form the body of the form tie and that they are discharged in a row from the hopper by the oscillating plate. As stated, the wires are discharged from the lower end of the row of the same by the escapement members 26 and 31. Each individual wire then is stopped momentarily by the lower end 41a of the stop finger 41 and held in position for the chamfering tool 49 to point or taper the end thereof. It will be understood that the various fluid pressure cylinders so far described are operated in certain, timed sequence. Furthermore, these cylinders are operated in timed sequence not only to each other but to the entire machine by a timing mechanism or "brain" of any suitable sort, such mechanisms being old and well known in the art. Stated differently, and once the description is completed, it will be apparent to those skilled in the art that various forms of devices for actuating the various cylinders and the like at the proper time may be used and the details of the same form no part of our invention as such.

The washer threading mechanism B

Referring now particularly to FIGS. 3 and 5, through 12, it will be seen that the mechanism for threading the wire through the washers comprises essentially washer holding mechanisms and wire moving mechanisms.

After the chamfering operation is complete the cylinders 42 are caused to move the holding blocks upwardly and, upon actuation of cylinder 29 the wire which has just been chamfered is released simultaneously with the release of the lowermost of the wire from the row above. The chamfered wire then rolls down a pair of support members 62. After the wire is released from beneath the fingers 41a these fingers move back to retain the oncoming wire which has just been released from the row above.

The chamfered wire, as stated, rolls down the members 62 where it strikes a downwardly inclined plate 63. On its way down the speed of the wire is slowed momentarily by a pair of spring actuated dogs indicated at 64 in FIG. 3. Therefore, when the wire reaches the end of the members 62 its speed is such that it simply rolls off the ends and onto the inner surface of the downwardly inclined plate 63.

Mounted at the lower end of the plate 63 are a pair of parallel, driven modified V belts 66, the adjacent sides of which are tapered as illustrated and provide what might be termed a running wedge or frictional engagement for receiving the wire blank as it rolls off the end of plate 63. The belts 66 pass over driven end pulleys 67 and over idling take up pulleys 68. The top flights of the belts are further supported by idler rollers 69. As best shown in FIG. 6 the belts are so spaced that the wire 11 is frictionally engaged between the tapered, adjacent surfaces of the sides thereof. The pulleys 67 are driven by a suitable belt 71 from a motor 72, see FIG. 5. In order to insure that the wire properly engages in the moving friction surfaces of the belts, a plate 73 is provided as a guard.

From what has been described it will be seen that the wire blank is released, with one end chamfered, rolls down the members 62, onto plate 63 and finally is engaged, frictionally, between the moving, converging side walls of the belts 66. This action causes the blank to move rapidly, chamfered end first, and pass through the aligned series of washers, the details of the holders and feeding means of which will now be described.

Referring now particularly to FIGS. 7 to 12, inclusive, we provide a plurality of washer holding and positioning mechanisms, spaced apart at appropriate distances and into which the washers are fed, one at a time and held in upright position to receive the blank or wire 11 coming from the belts 66. The washer holding mechanisms are indicated in the drawings, FIG. 7 generally by the numerals 74, 76, 77 and 78. Each of the mechanisms is mounted on a supporting plate member 79. By means of bolts 81 each of the mechanisms 74 to 78, inclusive, may be spaced at selected distances from each other, thereby to vary the spacing of the washers on the wire and to accommodate different lengths of wires. Except for the fact that in the specific case shown the intermediate or middle holders 76 and 77 are sized to accommodate a slightly larger washer than the holders 74 and 78, they are substantially identical and thus a description of one will suffice for all.

The washer holders proper comprise a fixed section 82 mounted on a base plate member 83, each of the plates 83 being supported from the standards 84 through which the bolts 81 pass. The washers are fed into the magazine portion 86 of the members 82 from the chute of the usual centrifugal, vibrating washer feed mechanism, the chute being indicated at 87 and the mechanism diagrammatically illustrated at 88. The magazine 86 in effect is nothing more than a slot into which the washers are delivered edgewise in a row from the chute 87.

Pivotally mounted at 89, at the lower end of the slot of the magazine 86, is a washer feed and positioning mechanism in the form of a plate 91 having an arcuate surface 92 which cooperates with a curved surface 93 in the end of the member 82 adjacent the lower end of the slot of the hopper 86. As best shown in FIG. 14 the member 91 is provided with a recess 94 adapted, when in the position of FIG. 9, to receive one of the washers 96 which, as shown, is one of the end washers. Also, a slot 97 is cut into the curved side of the member 91, across the walls forming the washer receiving pocket 94 thereof. Furthermore, the side plates of the member 82 which receive the movable member 91 are provided with similarly shaped slots 98 for a purpose to appear. Still further, the entrance sides of the openings 97 and the openings 98 are conical shaped to form a lead for the chamfered end of the wire to enter the same as will presently appear. Mounted on the support member 83, for each of the washer holding mechanisms is a fluid pressure cylinder 99 the piston rods 101 of which are pivotally connected at 102 to a lower extension of the members 91. With the parts in the position of FIG. 9 it will be seen that a washer has dropped from the magazine 86 into the opening 94 of the movable member 91, and this is the rod receiving position for all of the washer holders. As the rod passes through the aligned washers the chamfered end strikes a small spring plate 103 which actuates a switch 104. The actuation of switch 104 energizes all four of the cylinders 99, simultaneously, to cause the movable washer carrying and rod carrying members 91 to move from the position of FIG. 9 to the position of FIG. 10, the wire at this time carrying the four, accurately spaced washers threaded thereon.

Referring again to FIG. 7 at 106 we show a driven, grooved roller and a hold-down roller 107 between which the wire passes as it leaves the belts 66. The roller 106 is driven by a belt 108 from a pulley 109 fastened on the same shaft which carries the pulley 67. The pulley 106 is driven at a greater surface speed than the speed at which the wire is traveling while on the belts 66. Consequently, as soon as the wire passes between the rolls 106 and 107 its lateral speed is greatly accelerated, whereby it is passed at considerable speed through the washers being held by the mechanisms in the position of FIG. 9.

As shown in FIG. 8 the roller 107 is mounted in the end of an arm 111 which is pivoted at 112. A spring 113 urges the roller 107 down onto the top of the wire 11. However, when the movable members 91 are shifted from position of FIG. 9 to the position of FIG. 10, the spring mounting of the arm 111 and roller 107 permits the wire to be withdrawn from between the rollers 107 and 106.

From what has been described with respect to the washer feeding mechanism it will be seen that the individual wires, with one end chamfered, drop one at a time onto and between the belts 66 which are moving toward the washer holding mechanisms 74, 76, 77 and 78. The movable portions 91 of the washer threading mechanisms, each with a washer in place in the slots 94 thereof, and in the position of FIG. 9, hold the four washers aligned. As soon as the wire passes between the rolls 106 and 107 it is given a sudden, accelerated motion to the left as viewed in FIG. 7 whereby the chamfered end passes successively through the washers in the respective washer mechanisms and activates the switch 104. This simultaneously energizes the cylinders 99, moving the washer threaded wire, still supported in the members 91 to the position of FIG. 10. Thus, in the position of FIG. 10 the pre-straightened blank or length of wire 11 is supported, threaded through four washers, and ready to be liftted out of said supporting mechanism for the subsequent operations of heading the ends of the wire, securing the washers and crimping the wire, which mechanisms will now be described.

The transfer, heading and end washer fixing mechanisms and the crimping and intermediate washer fixing mechanisms Referring now again to FIG. 10 of the drawings it will be understood that the transfer of the wire with the washers threaded thereon commences with the parts as shown in FIG. 10, namely, with the washer threaded wire capable of being lifted vertically upwardly out of the slots in the members 91. The transfer mechanism proper comprises a frame having elongated side members 114 and end members 116. The entire transfer frame is supported by two pairs of links 117 and 118, the former being pivoted at 119 to the arms 121 of bell cranks 130a, pivotally mounted on a cross member 122 extending between vertical overhead columns or members 123.

The links 118 are pivotally connected at 124 to the arms 126 of bell cranks 130b which are mounted on shaft 127 which is in turn carried by suitable cross members of the framework.

Mounted for rotation in bearings is a cross shaft 128. Secured to the cross shaft is a pulley 129 which carries a cam 131 on its inner face. A roller-follower 132 mounted on an arm 133 secured to shaft 127 engages the contoured surface of the cam 131 thus to cause the shaft 127 and the bell crank 130b to rock whereby a substantially vertical motion is imparted to the links 118 and the transfer frame.

A connecting link 134 joins the upper ends of arms 136 of the bell crank 130b with the upper end of arms 137 of the bell crank 130a.

The pulley, and hence the shaft 128 and the cam 131 are driven by a belt 138 from a driven pulley 139 from a suitable power source 141.

From what has been so far described it will be seen that rotation of the shaft 128 and the cam 131 cause the framework 114 to move generally vertically, to raise from the position shown in FIG., 1 to a more elevated position for a purpose later to appear.

Mounted on the opposite end of shaft 128 is a second cam 142. Pivotally mounted on suitable members of the framework is a bell crank 143 having an arm 144 on the end of which is a roller-follower 146. The opposite end 147 of the bell crank 143 is pivitally connected at 148 to a link 150 which is in turn pivotally connected to the adjacent depending link 118 at that side of the machine, whereby rotation of the cam 142 imparts a horizontal motion to the transfer frame.

Figure 2:
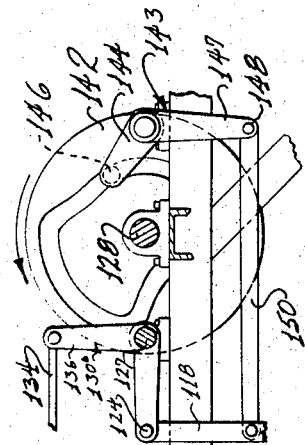
FIG. 2 is a diagrammatic plan view of the same.

Reviewing what has been so far described it will be seen that rotation of shaft 128 causes the entire framework consisting of the members 114 and 116 to move upwardly and to the left as viewed in FIG. 1, approximately to the height and position, leftward, as shown in dotted lines in FIG. 1. The whole purpose of the mechanism so far described is, in combination with the grippers presently to be described, to move the wire with the washers thereon, sequentially, from their positions in the holders 91 to a plurality of work stations, progressing from left to right, as viewed in FIG. 1. See also FIG. 21, which shows the path followed by one set of the grippers or pickup fingers.

Mounted in depending brackets 149, secured to the frame members 114 is a cross shaft 151. A pair of wire gripper arms 152 and 153 is pivotally mounted about the shaft 151. The arm 153 carries an extension portion 154 to which is connected a link 156. The opposite end of link 156 is connected to a member 157 secured to a cross shaft 158 which is mounted between the side members 114 of the frame.

Connected at 159 to the lower end of the member 157 is a link 161 which is in turn pivoted at 162 to the upper end of the wire gripping arm or finger 152.

Also secured to the shaft 158 is a depending operating link 163. The link 163 is secured at 164 to a push-pull rod 166 in turn connected to the piston rod 167 of a fluid pressure cylinder 168. The cylinder 168 as shown is pivotally mounted at 169 to a depending bracket 171 carried at the end of the framework.

Describing the operation of the fingers so far described the admission of fluid under pressure to the righthand end of cylinder 168 as viewed in FIG. 15 causes the rod 166 to move to the left. This motion opens the fingers 152 and 153, permitting the fingers to be placed about a wire carrying the washers. Opposite movement of the rod 166 causes wire gripping pads 172 to grip the wire, whereby it may be lifted and moved.

It will be understood that on each of the shafts 151 and spaced laterally apart we provide at least two of the wire gripping and lifting units consisting of the fingers 152–153 and associated mechanism. Furthermore, the rod 166 may extend alongside of and operate a series of the fingers spaced longitudinally of the framework as illustrated in FIG. 1.

Describing the operation of the lifting frame it will appear that as the frame moves from the lowermost position shown in FIG. 1 the fingers describe the path shown in FIG. 21. That is to say, starting in the position of FIG. 1, wherein a rod has been laid onto a work station, the fingers gripping a wire 11 move upwardly, then to the right to the point "e" and then downwardly to the point "f" whereupon the fingers release the wire 11, depositing the same on support brackets described hereinafter. After releasing the wire 11, the fingers move upwardly, returning to the point "e," then to the left to the points "g," and then downwardly to the point "h." At this point the fingers grip another wire 11. That is to say, the lefthandmost set of fingers group the wire 11 supported in the members 91 in the position of FIG. 10, while each succeeding set of fingers grip the wire 11 previously deposited on the support brackets by the preceeding set of fingers. From the point "h" the finger move upwardly returning to the point "g," thence to the right, and thence downwardly to the start position shown in FIG. 1. Therefore, by the provision of the work stations and subsequent pick-up stations for the wires the wires carrying the washers progress through the apparatus from station to station, where work is performed as will now be explained.

Next adjacent the washer threading station B we provide the mechanism shown in FIGS. 16 and 17 which upsets one end of the wire and secures thereto one of the end washers 96. Thus, essentially the work station indicated generally by the numeral 173 comprises a clamp for holding the wire 11 with the washer 96 thereon and embodies a stationary jaw portion 174. A movable die 176 is adapted to be actuated by a bell crank 177 pivoted at 178 to the framework 179. A fluid pressure cylinder 181 is adapted to press downwardly, as viewed in 16 on the arm 182 of the bell crank, whereby the arm 183 thereof moves the movable die 176 to the left as viewed in FIG. 17 and FIG. 16, to clamp or grip the wire, just inwardly of the outermost washer 96.

A heading die 184, operated by a fluid pressure cylinder 186 is adapted after operation of the clamping die to cold work the end of the rod outwardly of the washer 96, on one end, thus to provide a head 187 on one end of the wire. Due to the tight gripping of the wire by the clamping die, the metal inside the holder washer 96 itself is upset or worked, thereby to expand into the opening in the washer 96, firmly gripping it against inward movement relative to the wire. Of course, the head 187 prevents outward movement of the washer 96.

From the station 173 the wire with the washer thereon, thus headed on one end, is moved to a next work station 188. The work station 188 is a duplicate of the work station 173 already described except that it is placed at the opposite end of the wire, whereby as shown in FIG. 13 the opposite end of the wire is headed to provide a head 189 adjacent the other outer washer 96.

The transfer mechanism now transfers the wire, with both ends headed to a third work station 191, some of the details of the mechanism of which are shown in FIGS. 18 and 19.

Figure 13:
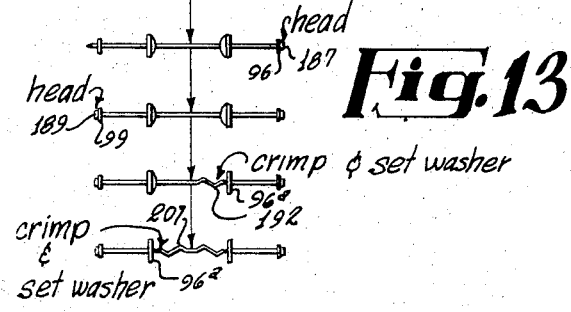
FIG. 13 is a wholly diagrammatic view illustrating the flow of the materials in accordance with our improved process and as the materials move through our improved apparatus.

Referring particularly to FIGS. 18 and 19 the work station 191 is a place at which the wire is crimped, at one place, to provide the crimp section 192 as shown in FIG. 13. Thus, this mechanism comprises a stationary jaw 193 having end indentations 194 therein.

A movable die 196 cooperates with the jaw 193. The movable die 196 is forced to the right as viewed in FIGS. 18 and 19 by means of a fluid pressure cylinder 197 operating through an arm 198 pivoted at 199 to the stationary jaw 193.

It will be seen that the wire carrying the intermediate washers 96a is laid into the open mechanism with the washer, which incidentally is a cupped washer, in the position shown in FIGS. 18 and 19. Immediately inwardly of the washer 96a the die 193 is provided with a coining portion 201 and the movable jaw is provided with a cooperating portion 202. Furthermore, at the station 191 we provide a working tool in the form of a pivoted member 203, actuated by a fluid pressure cylinder 204 which, at the proper time, engages the cupped washer 96a, flattening it, and thereby slightly closing up the opening therein, causing it to grip the wire tightly thus to hold it in place.

From the station 191 the wire carrying the thus headed ends, crimped section 192 and the flattened and secured washer 96a proceeds to a final work station 206. The work station 206 is identical to the work station 191 except that it is located to provide a crimp 207, identical with the crimp 192, and to flatten the adjacent washer 96a, thereby to secure it, likewise, to the wire. From the station 206 the finished product, as shown in the bottom section of FIG. 13, is moved onto a slide 208 where it is carried away by a conveyor belt 209 to any suitable place.

Referring again to FIG. 1 it will be seen that in the transfer of the wire from the stations 173 to 206 and finally to the slide 208, the wire is deposited in the following sequence: The lefthandmost fingers 152–153 first pick a wire from the members 91 and deliver it onto the station 173. Between the stations 173–206 and between the station 206 and the slide 208 we provide small support brackets 211 having upper, V-shaped ends onto which the wires are deposited as they move from station to station. Thus, following the path of a given wire starting from the members 91, the wire first is deposited by the fingers onto work station 73; thence is lifted up and onto the first support or intermediate stop 211; is then picked up by the secondmost group of the fingers and transferred to station 188, and so forth, until finally the wire is delivered onto the slide 208.

Summary of operation

Starting with the hopper of Section A of the apparatus filled with the pre-straightened wire blanks, the wires are fed one at a time from the hopper to provide a line of the same as shown in FIG. 3. The escapement fingers 26 and 31 permit the wires to drop out one at a time, where they are stopped momentarily by the fingers 41a. At this station the wires are chamfered on one end. Subsequentially, they fall by gravity down the slide or members 62 and onto the lateral, friction-grip belt feeding mechanism comprising the belts 66. During this time the members 91 have moved into the position shown in FIG. 9, relative to members 82, namely, in position to receive four of the washers, all in alignment, in the pockets 94 of the members 91. The wire is thus fed through the thus aligned, thus held washers, the conical sections 97 aiding in this threading movement.

Actuation of the cylinders 99 moves the wire carrying movable parts 91 of the wire holders to the position of FIG. 10. The gripping and lifting mechanism now grips the wire, moves it slightly upwardly and then downwardly to deposit the first wire onto the work station 173. At this station the head 187 is formed and the end washer 96 thereat is secured. Continued operation causes the lefthandmost set of the fingers as shown in FIG. 1 to lift the thus headed and washer affixed wire onto the first supporting or intermediate pedestal 211. Continued operation of the carrier mechanism causes the second fingers of the group to grip the wire on the pedestal, while the first set of fingers is gripping a new wire in the holders, whereby the first wire is then fed to station 188 and the new wire is fed to station 173, and so forth.

One of the important features of our present invention, in so far as the apparatus is concerned, lies in the friction feeding of the wire blanks by means of mechanisms such as the belts 66. In the event of any misfeeding of the wire during lateral movement the machine is in no way harmed inasmuch as the lateral movement is due simply to the friction, rather than a positive feeding of the wire. Furthermore, the conical entry sections into the sides of the washer holding devices, in combination with the chamfered end of the wire has been found to eliminate a great number of misfeeds of the wire.

It will also be appreciated that the reasons for crimping the wire sections at different stations is because the wire tends to shorten as it is crimped. For this same reason the transfer fingers, during each operation, release the wire and regrip the same.

It will further be understood that the entire machine is timed so that all of the various parts function in proper, timed sequence relative to each other. In view of the fact, as previously stated, that such timing mechanisms for the various motors, cylinders, valves and the like can vary greatly and are well known in the art, we have not shown any specific mechanism for doing so. The entire flow of the wires, one by one, from the point of release by the fingers 41a to and including the delivery onto the slide 208 is timed thus to provide a smooth, sequential movement, with time enough at each station to perform the assigned operation thereat.

A machine built in accordance with the disclosure herein is now in operation and is fully capable of carrying out our improved process. In actual practice we have produced approximately 860 snap ties, equipped with four washers, per hour. At present only two men are required to operate the mechanism and, based upon a comparable time study, my improved apparatus produces approximately 250 percent more of the devices per man hour than can be done by hand.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. The process of assembling onto a length of wire two end washers and two spreader washers and thereafter securing and forming the same to provide a concrete form tie comprising:
    (a) aligning the washers at holding stations laterally spaced at substantially the spacings at which the washers are to be secured to the wire,
    (b) moving the wire through the aligned washers and into threaded engagement therewith, and thereafter carrying out the following operations either in the following sequence or otherwise:
        (1) heading each end of the wire to secure said end washers in place adjacent the ends of the wire,
        (2) securing a first one of the spreader washers to the wire and crimping a first length of the wire between the spreader washers, and
        (3) securing the second of said spreader washers to the wire and crimping a second length of the wire between the spreader washers.

2. The process of claim 1 which includes the step of chamfering the end of the wire which is to be threaded through the washers prior to moving the wire through the washers.

3. The process of assembling and forming concrete-form ties embodying a length of wire and two end and two spreader washers comprising:
  (a) supporting the end and spreader washers at laterally spaced distances approximating their ultimate positions on the finished tie and with the holes therein in alignment,
  (b) moving the length of wire into axial alignment with the spaced washers and then laterally into threaded relation therewith thus to provide an assembled unit,
  (c) moving the unit to a first work station and while thereat heading one end of the wire and securing the adjacent end washer to the wire,
  (d) moving the unit to a second work station and while thereat heading the other end of the wire and securing the other end washer to the wire,
  (e) moving the unit to a third work station and while thereat crimping and coining a first length of the wire between the two spreader washers and securing one of said spreader washers to the wire, and
  (f) moving the unit to a fourth work station and while thereat crimping and coining a second length of the wire between the two spreader washers and securing the other of said spreader washers to the wire.

4. In apparatus for manufacturing form ties comprising:
  (a) a hopper for receiving a plurality of pre-straightened lengths of wire which form the body of the tie,
  (b) means to deliver said wires one at a time from the hopper,
  (c) wire feeding apparatus disposed to receive the wires as they are delivered from the hopper and move them endwise,
  (d) a plurality of washer holding mechanisms disposed to position a plurality of washers with the holes therein in the path of the wire coming from said wire feeding apparatus, whereby the wire is threaded through said washers,
  (e) means for removing the washer threaded wire from said holding mechanism, and
  (f) apparatus for heading the ends of the wire, securing said washers thereto and crimping portions of the wire, thereby to provide a ready-to-use form tie.

5. Apparatus as defined in claim 4 including mechanism for chamfering the end of the wire fed through the washers, said mechanism being located between the hopper and the wire feeding apparatus, and means to stop the wires during their movement from the hopper to the wire feeding mechanism whereby the lead end of the wires are chamfered prior to delivery onto the feeding apparatus.

6. Apparatus as defined in claim 4 in which the wire feeding apparatus comprises a pair of moving belts spaced apart sufficiently for adjacent sides thereof frictionally to engage a wire therebetween, thereby to move the wire endwise through said aligned washers, and means at the discharge ends of the belts and between the washer holders for engaging the wire while still held by the belts and accelerating its rate of speed through the washers.

7. Apparatus as defined in claim 4 in which the washer holders embody openings aligned with the holes in the washers therein, and generally conical shaped entrance ways in the sides of the holders on the wire receiving sides thereof cooperating with said openings, whereby the chamfered ends of the wires are guided into the holders and thence through the washers in the holders.

8. Apparatus as defined in claim 4 in which the apparatus as defined in element (f) thereof comprises:
  (1) a first work station embodying means to head one end of the wire and secure an end washer thereto;
  (2) a second work station embodying means to head the opposite end of the wire and secure another of said washers thereto;
  (3) a third work station embodying means to secure a third of said washers to an intermediate portion of the wire and also to crimp a length of the wire inwardly of said third washer;
  (4) a fourth work station embodying means to secure a fourth of said washers to an intermediate portion of the wire and also to crimp a length of the wire inwardly of said fourth washer;
    (a) means to move the washer carrying wires successively from the first to the last named work stations with pauses at each station of a duration to perform the stated work thereat, and
    (b) means to discharge the finished tie from the last work station.

References Cited

UNITED STATES PATENTS

| | | | |
|---|---|---|---|
| 3,254,391 | 6/1966 | Leger | 29—34 |
| 3,346,940 | 10/1967 | Agostini et al. | 29—208 |

THOMAS H. EAGER, Primary Examiner

U.S. Cl. X.R.

29—34, 208, 211, 241, 505